United States Patent
Runge et al.

(10) Patent No.: US 8,447,015 B2
(45) Date of Patent: *May 21, 2013

(54) METHOD AND SYSTEM FOR PROCESSING MESSAGES WITHIN THE FRAMEWORK OF AN INTEGRATED MESSAGE SYSTEM

(75) Inventors: Fred Runge, Wuensdorf (DE); Christel Mueller, Schulzendorf (DE); Heiko-Armin Schönebeck, Schulzendorf (DE); Frank Niedermueller, Mainz (DE); Jin Liu, Berlin (DE); Marian Trinkel, Kreuzau (DE)

(73) Assignee: Deutsche Telekom AG, Bonn (DE)

( * ) Notice: Subject to any disclaimer, the term of this patent is extended or adjusted under 35 U.S.C. 154(b) by 18 days.

This patent is subject to a terminal disclaimer.

(21) Appl. No.: 12/870,773

(22) Filed: Aug. 27, 2010

(65) Prior Publication Data

US 2010/0324909 A1 Dec. 23, 2010

Related U.S. Application Data

(63) Continuation of application No. 11/251,381, filed on Oct. 14, 2005, now Pat. No. 7,809,117.

(30) Foreign Application Priority Data

Oct. 14, 2004 (DE) .......................... 10 2004 050 785

(51) Int. Cl.
*H04M 11/00* (2006.01)

(52) U.S. Cl.
USPC ................... 379/88.13; 379/88.22

(58) Field of Classification Search
USPC .................. 704/2, 270.1, 277, 278, 257, 258, 704/200.1; 379/100.08, 88.05, 68, 88.16, 379/88.22, 88.23, 88.13
See application file for complete search history.

(56) References Cited

U.S. PATENT DOCUMENTS

| 6,064,383 | A | 5/2000 | Skelly | |
|---|---|---|---|---|
| 6,963,839 | B1 | 11/2005 | Ostermann et al. | |
| 6,975,988 | B1 * | 12/2005 | Roth et al. | 704/260 |
| 6,976,082 | B1 * | 12/2005 | Ostermann et al. | 709/231 |
| 7,315,613 | B2 * | 1/2008 | Kleindienst et al. | 379/88.13 |
| 2002/0069048 | A1 | 6/2002 | Sadhwani et al. | |

(Continued)

FOREIGN PATENT DOCUMENTS

WO WO03/024073 3/2003

OTHER PUBLICATIONS http://www.t-mobile.de/mobilbox.
http://www.nuance.com.
http://www.scansoft.com.
http://www.ibm.com/software/voice/viavoice.

(Continued)

*Primary Examiner* — Olisa Anwah
(74) *Attorney, Agent, or Firm* — Kenyon & Kenyon LLP

(57) ABSTRACT

A method and system for processing messages within the framework of an integrated message system. Recipients of messages in an integrated messaging system are provided with an authentic impression of the received message. In a first step, a message received within the framework of an integrated messaging system is automatically translated. Language detection and dictation system is provided. The message contents of the incoming message as well as its segments and parameters are simultaneously utilized to generate additional information regarding the sender and the information, which is suitable to give the recipient an impression of the received message in the most authentic form possible.

15 Claims, 2 Drawing Sheets

U.S. PATENT DOCUMENTS

| | | |
|---|---|---|
| 2003/0069728 A1* | 4/2003 | Tato et al. .................. 704/231 |
| 2003/0163300 A1 | 8/2003 | Kasvand et al. |
| 2007/0129934 A1 | 6/2007 | Alpha |

OTHER PUBLICATIONS www.nuance.com/assets/pdf/nuanc85_datasheet_020304.pdf.

Liu, Fu-Hua et al., "Noise robustness in speech to speech translation", IBM Tech Report RC22874, 2003.
http://penance.is.cs.cmu.edu/11-733/Slides/JoyZhang.pdr.
http://www.linguatec.de/products/pt2004/inde.shtml.

* cited by examiner

METHOD AND SYSTEM FOR PROCESSING MESSAGES WITHIN THE FRAMEWORK OF AN INTEGRATED MESSAGE SYSTEM

CROSS-REFERENCE TO RELATED APPLICATIONS

The present application is a continuation of U.S. patent application Serial No. 11/251,381, now U.S. Pat. No. 7,809,117 filed Oct. 14, 2005 which claims priority to German Patent Application No. DE 10 2004 050 785.6, each of which is expressly incorporated herein in its entirety by reference thereto.

FIELD OF THE INVENTION

The present invention relates to an integrated messaging system and to a method and a system by which messages that are transmitted within the framework of an integrated messaging system, such as a mailbox, are offered to a recipient with an information content that is not readily apparent from the unprocessed message.

BACKGROUND INFORMATION

Messaging systems (Mobilbox, voice mail systems) are available in the marketplace (e.g., http://www.t-mobile.de/mobilbox). Depending on the system structure, voice messages are often stored here as attachments of text messages (e-mail attachments together with sender information (such as sender identification (e.g., CLI, etc.)), arrival time, etc.

There are also various speech recognition systems in the telephone sector (e.g., http://www.nuance.com; http://www.scansoft.com, etc.), and systems for desktop dictation recognition (e.g., Dragon Naturally Speaking at http://www.scansoft.com, and IBM ViaVoice at http://www.ibm.com/software/voice/viavoice), which are able to convert spoken language into text information. These systems have at their disposal deterministic grammars (e.g., nuance grammar specification language) or grammars based on internal statistics (e.g., Scansoft). The latter are produced mostly in an application-based or domain-based manner with the aid of a large quantity of textual data, for example, from newspaper articles, books or language data compilations, so as to calculate detector-internal probability models for word transitions from word sequences occurring in these texts.

To assist in multilingual speech recognition, newer speech-recognition systems also offer internal functions for dynamic foreign language detection (e.g., http://www.nuance.com/assets/pdf/nuance85_datasheet_020304.pdf). A foreign language detection based on algorithms from speech-signal processing may be implemented by, for example, analyzing the frequency at which phonemes occur in a spoken utterance, which are provided by a phoneme-based speech detector.

Reference WO 03/024073 purportedly refers to a method for presenting information from telephone messages to a user where a search for predefined information is implemented within voice messages. The method apparently includes the steps of receiving incoming telephone messages and detecting language in the incoming telephone messages by searching the incoming telephone messages for at least one previously defined information category. If a previously predefined information category is found in the detected language, the information is reproduced for the user. And, single-language systems are not always able to be used if, for instance, messages in different languages are involved. However, this and similar methods fail to take into account that the received voice messages may have been recorded in a language other than the one required for the recipient.

Also available are systems for translating written language and spoken language (e.g., Fu-Hua Liu et al. "Noise robustness in speech to speech translation", IBM Tech Report RC22874, 2003), in which a method for reducing noise on the speech detection level is described.

Available translation systems (e.g., http://penance.is.cs.cmu.edu/11-733/Slides/JoyZhang.pdf and http://www.linguatec.de/products/pt2004/index.shtml), assume knowledge of the source and target languages for selection of the appropriate translation module.

Available approaches appear to provide that no automatic foreign language detection takes place where the language of the incoming message is detected, and specifically on the source language side.

Also available is classifying messages both according to acquired supplementary data and according to their contents, and to categorize them in accordance with the mailbox owner's or the system operator's intentions. Reference European patent no. 1298872 purportedly refers to a method for processing messages in a unified messaging system where different message categories are defined so that each message in a unified messaging system is able to be assigned to a rule that is part of at least one category. For example, the message category may include categories that are assigned to specific types or formats, as well as categories that are freely definable. It is possible to define specific rules for the message categories which are used for message assignment. This approach, too, fails to take a possible multi-linguality of incoming messages into account.

Reference US 2002/0069048 presents some general ideas for translating messages with output in an audio format, without a detection of the source language having been described in greater detail. Such approaches have the disadvantage that during the dialogue with the system the message recipient is obliged to explain in cumbersome detail in what target languages he wishes the audio output of each individual message to occur.

Also available are approaches that are based on detecting various sensor data and their transmission via a telecommunication network. Reference DE 101 49 049 A1, for example, purportedly refers to a method and a system for creating and modifying a virtual biological representation of the users of computer applications based on biological parameters of the user of the computer applications.

SUMMARY OF THE INVENTION

Exemplary embodiments and/or methods of the present invention provide recipients of messages in an integrated messaging system with the most authentic impression of the message possible. This may apply both to the message itself, which is to be offered to the user in comprehensible form, and to additional information in connection with the message and message sender that cannot be gathered explicitly from the message itself. Exemplary embodiments and/or methods also may solve the specific problem that the incoming message is a message expressed in a language that is unknown to the recipient. Exemplary embodiments and/or methods may improve the recipient's understanding of the message content by offering the message as an event with the highest possible authenticity and an increased information content. At the same time, the solution is aimed at improving the structuring of message groups and at improving the navigation within the messages itself.

Exemplary embodiments and/or methods of the present inventions offer the messages to the recipient in the most authentic manner possible and as a real experience, engaging as many of the recipient's senses as possible. This may increase the performance especially for a group of persons that is active on an international level for the most part. This may apply specifically to persons working in international management or in areas of international research, development and culture.

In the following discussion, a message or a message document denotes a document and/or a document segment received via a messaging system, which may include a variety of information formats such as, for example, text, video/image, audio/speech, biometrical information, smell information, gesture information, temperature information, etc. Both the attributes of the message document such as receiving time, sender's address, sender identification, sender's name, sending time etc., as well as appendices and references may be considered part or segment of the message document.

The term message segment is understood to denote a part or an information unit of a message document such as a sentence, a sentence sequence, a word, a word sequence, a bit sequence, a paragraph, a paragraph sequence, or an attachment. Message segments may have an identical and/or different format, for instance an audio format, a text format, a video format, an image format, or also other possible formats. A link is possible as well.

An identification within the meaning of the present invention may be made up of one and/or a plurality of classes.

In exemplary embodiments and/or methods of the present invention, the individual classes can be technical features for, e.g.,
1. the customer identification such as
    customer number
    PAN,
    a personal identification card number;
2. the communication identification such as
    CLI (calling line identification)
    HLR (home location register)
    IP address (Internet protocol)
    call number, telephone number
    telecard number;
3. the device identification such as
    IMEI (international mobile equipment identity)
    Telecard number
    SIM card (subscriber identity module) smart card;
4. the transaction identification for the communication transaction;
5. biometrical identification such as
    fingerprint
    voice print
    iris.

Exemplary embodiments and/or methods of the present invention may provide that, in a first step, messages arriving via an integrated messaging system are translated into a language specified or preset by the recipient. To this end, incoming voice messages, for example, after conversion into source-text information by a speech recognition and dictation system, may be automatically translated into a desired target language and then made available to the user.

At the same time, in further embodiments and/or methods, the information contents of the incoming message and its segments and parameters is utilized to generate additional information regarding the sender and regarding other message-related facts that are suitable to convey to the recipient an understanding of the creation of the message in the most authentic form possible. In the process, information about the sender that may possibly not be available in system-internal data records, is meant to be generated as well.

In exemplary embodiments and/or methods, storing and/or collecting corresponding information such as, for example, the mailbox owner's preferred target language, in an owner data area 170. The owner data area is a memory area for acquired and/or ascertained owner data such as the ID code, user identification, mother tongue, desired target language, preferred TTS voice, preferred playback speed, target call numbers and search keywords for important messages. The setting may be made via a Web interface and browser, for example, by voice input in a multi-modal or uni-modal manner, or by e-mail via mailbox 30 of the mailbox owner. Once the identification has been detected, embodiments and/or methods of the present invention provides an additional language-evaluation module 100 which includes an algorithm for selecting the most likely language. Language-evaluation module 100, utilizing all available information, is used for the ultimate determination of the source language of an incoming message. Additional language-evaluation module 100 is required since the use of automatic methods based on language detection by the application of methods of language-signal processing or methods that are based on language detection on the basis of a text, may lead to false results. False results in the above sense may occur, for example, if a German message is spoken by a speaker inexperienced in German phonetics, or in texts with mixed languages. Via a sender data area for acquired and/or ascertained sender data 60, it is also possible to prepare a profile for the preferred sender language for senders often encountered in the mailbox, such a profile being settable both administratively and after analyzing already existing messages of the particular sender in the sender data area for acquired and/or ascertained sender data 60. In further embodiments and/or methods of the present invention, this feature may need to be combinable with another feature of the present invention since different languages may be used in different situations, for example, when messages from a sender are addressed to one recipient in the German language and to additional recipients in the English language. Similar also may apply if only an identification were analyzed, for example, a CLI with an international prefix. For these reasons, the sender data area for acquired and/or ascertained sender data 60 may be configured to store not only the parameters explicitly entered by the mailbox owner but also parameters that the system ascertains from the incoming messages of the sender. This can be, among other things, the most likely language spoken, the ascertained gender of the message sender, the ascertained emotional disposition of the message sender and/or the age category of the message sender. In addition, the mailbox owner may have the explicit possibility of overwriting data stored in the sender data area for acquired and/or ascertained sender data 60, for example, via Web interface and browser, or over the telephone, in a multi-modal or uni-modal manner, for instance by speech recognition. In further embodiments and/or methods, an additional development of the memory area for acquired and/or ascertained sender data 60 is to retain or store the history of ascertained sender data for later analysis. For example, if a mailbox owner always deletes the messages from a sender without listening to them or reading them, starting with a number predefined in the system, it may be possible to generate a parameter linkage within the system that classifies the messages from this sender as spam and either deletes them immediately or shifts them into a memory area having an extremely low priority. As a result, such messages are always played last.

The linking of messages by an individual receiver mailbox itself or by its sender CLI, as well as other sorting criteria such as the receiving time, are available in the related art. Exemplary embodiments and/or methods of the present invention now allow a linking of messages according to their content in a manner that goes beyond the individual mailbox, if appropriate. A considerably simplified classification of messages results from the expansion of the sender addresses/sender information (CLI, HLR, e-mail address, time information) by brief, abstracting content descriptions such as class names.

Systems for acquiring various sensor data and their transmission via a telecommunication network are available. Supplementing messages within the messaging system by these data allows both more refined search criteria within individual message classes and the creation of novel message classes.

DETAILED DESCRIPTION OF THE DRAWINGS

Figure 1:
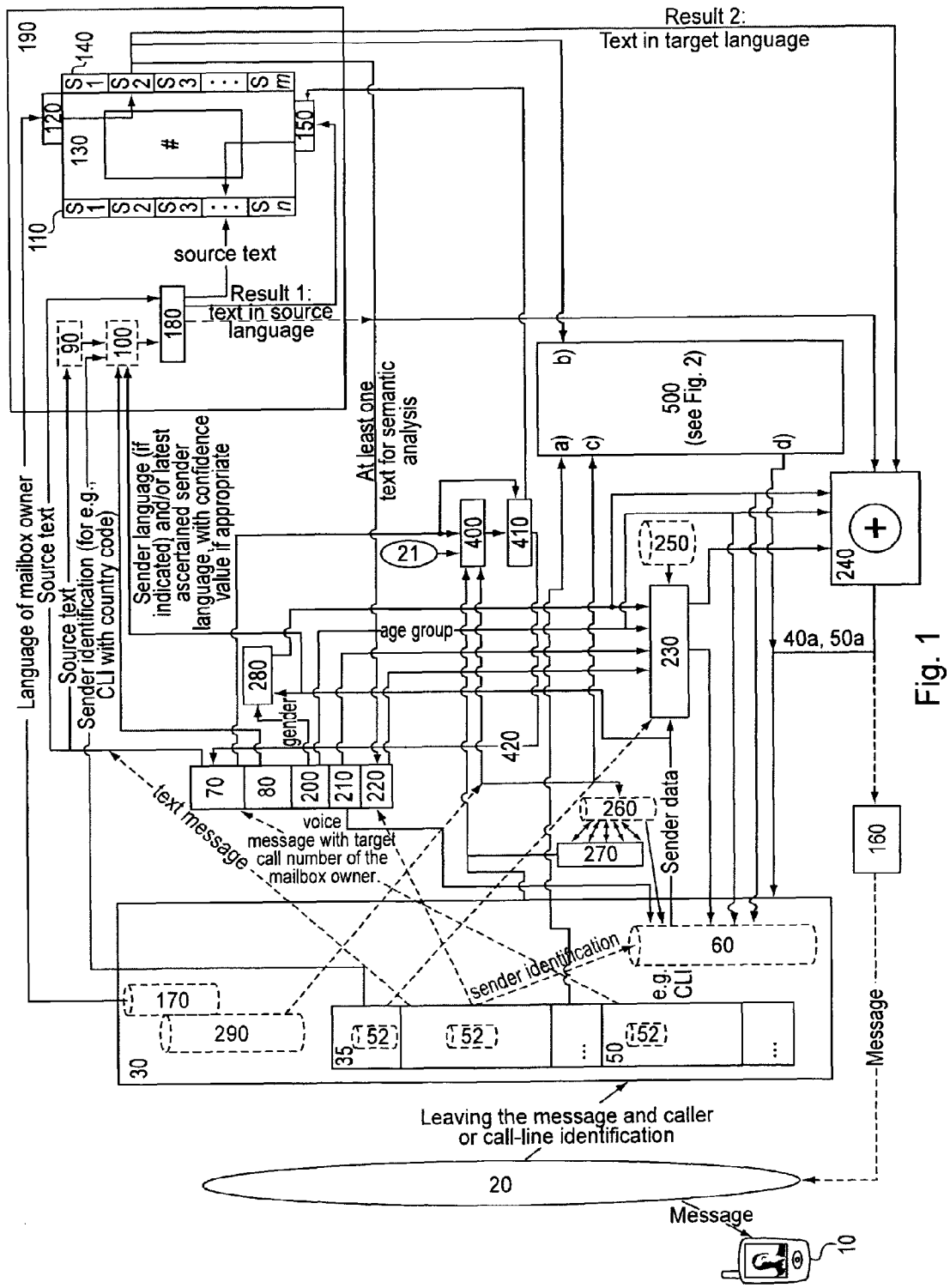
FIG. 1 shows a block diagram of an embodiment of the present invention.
Figure 2:
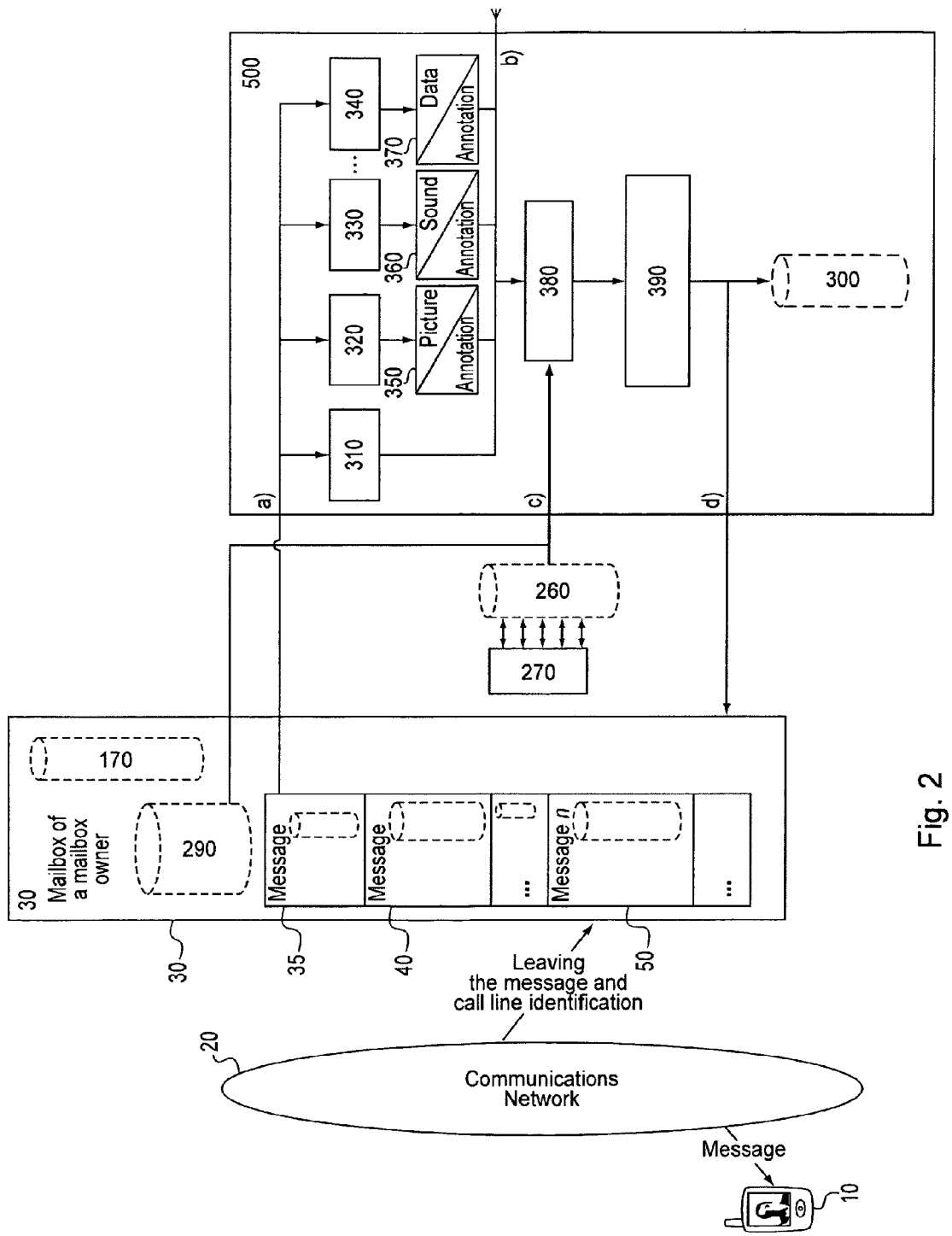
FIG. 2 shows an architecture for an embodiment of an exemplary development of classification block 500.

The exemplary embodiment that is described with the aid of FIGS. 1 and 2 requires, for example, an integrated messaging system designed as a mailbox system. However, another possibility is using the solution in an online application. Hereinafter, the solution will be described in connection with mailbox 30 of a mailbox owner.

In addition to the messages that are intended for the mailbox owner and result from the memory area for incoming text messages and supplementary messages 40, as well as from the memory area for incoming voice messages and supplementary messages 50, mailbox 30 may be aware also of data of the owner that are stored in the owner data area for acquired and/or ascertained owner data 170, and also of data of the message sender such as the owner CLI. Supplementary messages are to be understood as supplementary information such as additional text, image and video information as well as information of other media types (also media-spanning types). The same also applies to data relating to the sender of the message, which had been compiled previously already and were transmitted via communication network 20.

Mailbox 30 is assigned at least one ASR module 70 with algorithms for language detection, a module for language detection 80 for foreign language detection, and at least one language-evaluation module 100 with an algorithm for selecting the most likely source language of a message received from a sender 10. The language-evaluation module 100 weights the results of the intermediate results of the language detection by module for language detection 80 and possibly at least one module for language recognition/language detection on the basis of a text 90, possibly by the country prefix from the sender identification and the preferred language that may have been entered in the sender data area for acquired and/or ascertained sender data 60, providing as a result the most likely source language by applying suitable, possibly statistics-based algorithms.

The result may be used not only for the further correction of the preferred language of the sender in the data record assigned to the sender's transmitted identification, which is stored in the sender data area for acquired and/or ascertained sender data 60, but also for the automatic selection of the source language by translation system 190. For example, the emotional disposition, the preferred language, the probable gender, age or age group of the sender may be recorded in the sender data area for acquired and/or ascertained sender data 60. The target language of the automatic translation is selected on the basis of the data of the individual mailbox owner, which is stored in the owner data area for acquired and/or ascertained owner data 170.

Translation system 190 may be made up of a large number of products/translation systems of different manufacturers. An automatic selection of the language combination, and thus the required translation module, takes place by the implemented source and target language determination. If a directly required combination is not available, it is automatically searched for a possible interlingua combination. In the following, exemplary translation system 190 is described in greater detail.

To determine the source language, which is accomplished via language evaluation module 100, an additional algorithm for the selection of the most probable language is required in which the input information may be weighted differently, for instance, either in general or as a function of the message type, and/or statistical methods are applied. Here, the algorithm always determines the language that delivers a maximum value for a predefined function for the given message or for the segment of a message at the given time.

The language of a message and/or the segments of a message may be ascertained in the following manner, for example:

$$L=\mathrm{argmax}(W_{CLI}(Lx)+W_{LD}*C_{LD}(L_x)+W_T*C_T(L_x)+W_H*N_H(L_x)+\ldots+W_n*C_n(L_x)),$$

with the following explanations:

L—determined language of a message and/or a message segment $W_{CLI}$—weighting factor for the country code of a message (such as +49 for Germany) in combination with a specific language Lx $W_{LD}$—weighting factor for the language detection by application of speech-signal processing methods (80)

$W_T$—weighting factor for language detection on the basis of a text (90)

$W_H$—weighting factor for the languages determined from previous messages of a sender $W_n$—weighting factor for additional input parameters of (100), among them image and video, for instance $L_x$—concrete argument (concrete language from a list n of possible languages) for which a functional value is calculated from n functional values $C_{LD}$—confidence value ascertained by 80 (such as probability) of the language determined by 80

$C_T$—confidence value determined by 90 (such as probability) of the language ascertained by 90

$N_H$ Number of values for $L_X$ previously ascertained for a sender number of the language values previously ascertained for a sender $C_n$—confidence value (such as probability) of source language Lx ascertained by additional methods.

The weighting coefficients may be given individual preadjustment values either by the system administrator and/or the mailbox owner. However, the preadjustment values may also be determined in an automated manner, for instance within the framework of a neural network. The confidence values for the given message with regard to the languages supported by the system are ascertained in an ASR module 70, which may be configured as server or server group with algorithms for language detection, and/or they are ascertained by a module for language detection 90. In the module for language detection 90, the language detection is implemented on the basis of a text. If no confidence value is determined for a supported language, the value is assumed to be 0 (zero), for example. If only the language is determined as the result of a module, without the provision of a confidence value, some other fixed value such as 1 (one) may be assumed as confidence. The mentioned function is implemented for each source language supported by the system. The particular language for which the maximum value is achieved according to the previously mentioned algorithm will be considered the source language. If the same maximum value or maximum values that are very similar is/are reached for a plurality of languages, the message cannot be translated. In this case, the recipient (mailbox owner), when reading/playing back the message, may perhaps choose between the languages—now restricted in their number—, or a system administrator and/or the mailbox owner receive a message, for example, with the request to correct the weighting coefficients of the algorithm.

The result of the language detection of the source language is used both for the further correction of the preferred language of the sender by the data from the sender data area for acquired and/or detected sender data 60, and also for the automatic selection of the source language for translation system 190. Via the output module for target languages 140, which is designed as software interface with target languages $S_1$-Sm, in conjunction with the owner data area for acquired and/or detected owner data 170, the preferred language of the mailbox owner, and thus the target language into which the message is to be translated, is ascertained.

The translation module with decision matrix 130 is connected both with at least one input module for source languages 110 having source languages S1 to Sn, and with at least one output module for target languages having target languages S1 to Sm. The decision matrix of translation module 130 also may have an n-dimensional design. The translation module with decision matrix 130, which encompasses different translation modules from a first language into a second language, is controlled by the input module for source languages 110 and by the module for selection of the target languages 120, which is configured as software interface in translation system 190. The control of the individual translation modules of the translation module with decision matrix 130 is implemented via the decision matrix of translation module 130 into which both the result of the detection of the source language and the ascertained target language are input automatically.

The translation module with decision matrix 130 may be composed of products or translation systems of different manufacturers. Due to the source and target languages being determined according to the aforementioned principles, an automatic selection of the language combination(s) takes place, and, thus, also a selection of the translation module required for the translation. For instance, if a required translation module for translation from a language S1 into a language S3 is not available, but translation modules from language S1 into a language S4 and from language S4 into language S3 are available, the translation request is able to be carried out by combining the mentioned translation modules and applying language S4 as interlingua. A resulting lower translation quality also may be acceptable.

In addition to the data that result from the translation of the message, the message recipient may be given additional information about the message by employing associative knowledge management systems, for example, utilizing a large number of available data as well as data obtained via classification and knowledge management and their linking in integrated messaging systems. Knowledge management systems may be understood as, for example, search engines as well as associative knowledge management systems.

In addition to the sender profile such as name, first name, sender identification (for instance, CLI, personal ID . . . ), e-mail address, country code, gender, different call numbers, roll assignment for a particular call number (such as consumer, business), the data record of the mailbox owner also notes which source languages may be excluded from a translation. If there is a match between the source and target language, or if a particular source language has been excluded from translation in the data record of the mailbox owner, the utilization of that particular translation module of translation system 190 is excluded after evaluation of the most probable source language and the owner data of the data record of the mailbox owner. If the original message is a voicemail, the text body of the e-mail, ascertained via ASR module 70, is recorded in the memory area for incoming voice messages and supplementary messages 50, and/or in a supplementary message as text in the original language and, if available, as language text 50a translated into the target language, in the text body as well as supplementary data record in the memory area for supplementary information of individual messages 52. If the original message was a text message, perhaps including an unspecified attachment, the text message is supplemented by supplementary text 40a translated into the target language, if available, or the text in the target language will be included in the supplementary data record. Each of the individual text portions in different languages is supplemented by a supplementary datum that characterizes the selected language. This allows selection of the correct pronunciation dictionary for the individual language in a subsequent multilingual reproduction of the texts of this message via speech synthesis.

In general or after successful search of key words stored in the owner data area for acquired and/or ascertained owner data 170, the messages, which have been converted into text, are able to be sent to the target call numbers correspondingly marked in the owner data area for acquired and/or ascertained owner data 170, for example, as SMS, MMS. This search for specific characteristics may be utilized to filter out undesired voice messages (e.g., voice spam).

Corresponding internal deletion parameters and parameter linkages that make further analysis of the contents unnecessary may be generated on the basis of the results. If the operator of the integrated messaging system detects the generation of such parameters and/or parameter linkages in a multitude of its mailbox owners, it may use these to generate universally valid parameters and/or parameter linkages in the data memory with sample data 260. The data memory with sample data 260 includes sample data and/or dynamic and/or static parameters or parameter linkages.

According to the present invention, the system shown in FIG. 1 also may be utilized to record probable emotional states and/or probable age groups and/or the gender of the sender of a message.

In addition to the already described embodiments/methods, the corresponding system expansions also may include at least one module for speaker classification 200 and/or at least one module for analyzing speaker emotions 210 by prosody analysis and/or at least one module for analyzing sender emotions 220 by semantic analysis of the message contents and/or analysis of the image message, at least one data memory for information regarding the languages that are able to be processed by the available emotion-analysis module and/or translation module(s) 250, and/or, at least one data memory with sample data 260.

To ascertain the most probable emotional state of the sender of voice messages via a module for ascertaining the most probable emotional state 230, both prosodic information resulting from voice messages and results from the semantic analysis of available texts and/or additional media types relating to the sender, such as image or video information, are evaluated. The gender and/or age of the sender of the message are/is determined via at least one module for speaker classification 200. As additional basis of a system for ascertaining the most probable emotional state of a caller—such system becoming more refined in the course of usage—corresponding statistical data of the caller, which are stored in the sender data area for acquired and/or ascertained sender data 60, are analyzed. This is data from earlier analyses, which may include, for example, weightings for individual events, similar to the determination of the most probable language. In addition to statistically dynamically acquired data (such as owner behavior with specific e-mail senders), the sender data area for acquired and/or ascertained sender data 60 also includes the sender profile, for instance the name, first name, sender identification (such as CLI, personal ID, etc.), e-mail address, country code, gender, different call numbers, role assignment for a specific call number (such as consumer, business). Selected profile data are also able to be generated by the system and/or be provided with supplementary information (for example, probability values, confidences).

For example, if the mailbox owner has not created an entry for the gender of a sender, it is also possible to dynamically enter this value again in the sender data area for acquired and/or ascertained sender data 60 once these data have been determined from the module for speaker classification 200 and/or from the data of the module for ascertaining the most probable gender 280, taking past results from the sender data area for acquired and/or ascertained sender data 60 into account including supplementary data. This applies in a similar manner to the age group determination and to the analysis of emotions via the module for prosodic analysis of speaker emotions 210 and the module for semantic analysis of sender emotions 220, respectively.

Since both the module for analysis of speaker emotions 210 and the module for analysis of sender emotions 220 as well as the module for speaker classification 200 may depend on the language used, the source language determined via decision module 180 may be used to select the data records of modules 200, 210 and 220 that are available for this language. If appropriate, decision module 180 includes source-text forwarding to mailbox 30 for voice messages and/or further analysis. If the source language is identical to the target language, no translation will be provided. Otherwise, the source text will be forwarded to translation system 190, and the information concerning the source language be transmitted to the interface module for selecting the source language 150.

If no analysis module is available for the selected source language, translation system 190 begins a search for translation modules that provide as result a language that is suitable for the semantic textual emotion analysis.

The ascertained probable emotional state of the message sender together with the possibly ascertained information regarding age group and/or gender and/or time information is recorded in the sender's data record for further statistical analysis. Universally valid parameters and/or parameter linkages for analyzing sender information are specified both statically, by the system administrator, and are ascertained by analyzing a multitude of parameter sets of the mailboxes of other mailbox owners 270 in the integrated messaging system. The desired data may be accessed via Internet/Intranet 21.

Such parameter linkages may be used, for example, to determine the gender from the speaker classification and first name of the sender (if available). Such parameter linkages may read, for example:
IF first name="Andrea" AND international prefix="+49" (Germany) AND (speaker classification=male; confidence <90%) THEN gender:="female";
or
IF first name="Andrea" AND international prefix="+39" (Italy) AND (speaker classification=male; confidence > 60%) THEN gender:="male";
or
IF first name="Andrea" AND international prefix="+39" AND (speaker classification=male; confidence=50%) THEN gender:="undetermined".

Instead of the international prefix it is also possible to use some other identification in this context. A universally valid parameter thus is valid for all mailboxes 30, and is used for messages of a specific owner. The aforedescribed parameters and/or parameter linkages, which are able to be entered permanently by the administrator of the system or by the mailbox owner, are also referred to as static parameters. Dynamic parameters are generated by the system itself. Such a generation of parameter linkages might be carried out in the following manner, for example:
Upon detecting a larger number of senders having the first name "Peta" with the international prefix +kk in more than N mailboxes of different owners, and a gender detection from the speaker classification of "male", confidence >90%, in more than M cases, the following dynamic parameter linkage, for instance, will be deleted
IF first name="Peta" AND international prefix="+kk" AND (speaker classification=male; confidence=50%) THEN gender:="female",
the following new parameter linkage being generated:
IF first name="Peta" AND international prefix="+kk" AND (speaker classification=male; confidence>=50%) THEN gender:="male".

The examples assume that the general probability for gender assignment is approximately 50%, i.e., IF (speaker classification=male; confidence>=50%) THEN gender:="male"; and IF (speaker classification=male; confidence<50%) THEN gender:="female".

The confidence values may be scaled differently in different systems.

In addition to general parameters, exemplary embodiments and/or methods further may involve defining and/or generating mailbox-internal, static and dynamic parameters and their linkages. These parameters are generated solely on the basis of mailbox-internal data or entered by the owner, and they apply only to the messages of the mailbox owner, it being possible in some cases that external, universally valid parameter linkages are overwritten by internal parameter linkages. Here, too, the prioritization of messages of specific senders, for instance, may be defined, for example:
IF (message having sender identification X) AND (listening to messages having sender identification X broken off with 80% probability) THEN set priority(X):=priority(X)−1;
WHEN priority(X)<=0 THEN (skip playing of the message)
etc.

More recent events may receive greater weight when ascertaining the break-off probability, for example, so that the parameter linkages are able to be rapidly adapted to current requirements.

As already described, there are dynamic and static parameters. In addition, default parameters are set when initializing the system in the first step. These default parameters may be overwritten by dynamic, system-generated parameters. These in turn are able to be overwritten by static parameters that result from permanent inputs of the mailbox owner or the system administrator.

Since both the language detection and the translation may require a general analysis of the semantic information, these operations may be processed in an overall module made up of ASR module 70 and the module for analyzing sender emotions 220, or also in separate modules from different manufacturers.

The sender data area for acquired and/or ascertained sender data 60, which is configured as database, forms the basis of a self-learning system for perfecting the determination of the source language, the sender's gender, sender's age group and the probable emotional state of a message sender, utilizing parameter linkages that are modifiable internally and externally.

The probable emotional state may also be used to prioritize messages. Furthermore, in this context, it is also possible to derive individual weighting factors of individual emotional states from frequent emotional states of particular senders, these weighting factors influencing the parameter linkages that are stored in the data memory having sample data 260 and in the module for determining the most probable gender 280, which are analyzed when determining the most probable emotional state.

Ascertained sender data may be utilized for parameter control, for example, to select the voice in the synthetic reproduction of text messages (speech synthesis, text-to-speech).

Since the sender data ascertained from the individual messages need not be complete, the system is able to obtain an interface that offers the possibility of searching, for example, in company-internal address databases, for further data that have not been taken into account yet. The available data are utilized as search parameters. Furthermore, the system must be robust with respect to faults, and error-tolerant. It may happen, for example, that the same sender is administered multiple times in the system if, for example, he has left only a voicemail and an e-mail without leaving the call number. As soon as a mailbox owner, for example, establishes a connection between the two sender datums via an administration interface in that he amends the e-mail if the CLI is given, and/or the system amends the corresponding parameter by automatic evaluation of the message contents in one case, all messages from this sender bearing the sender's CLI or e-mail address are able to be assigned to a sender data record. This may be done not only for an individual mailbox but for all sender data records of the sender data area for acquired and/or ascertained sender data (60) of the system's mailboxes.

Furthermore, in further embodiments/methods, already acquired or generated supplementary data may be classified according to their content. The classification may occur either according to the specifications of the mailbox owner and/or according to the specifications of the system operator. The generated supplementary data may be combined into message groups (clusters) which are able to be processed jointly. Message groups may be combined according to the predefined priorities, for instance according to sending date, sender identification (such as CLI, sender ID).

Another possibility for grouping/classifying/clustering is to analyze the content types of different messages and/or message segments. Some methods for automatic (textual) annotation of image, video, sound, and other recordings, or for converting supplementary measured sensor values into corresponding text information which, in combination, reflect the contents of the messages, are available. The data resulting from messages of different types of contents are able to be semantically analyzed, processed according to predefined classification rules, and assigned via a linking matrix 390 which is configured as assignment matrix (n:m) for different classes/categories.

This also makes it possible to assign a message to a plurality of classes/categories. For example, an image message could be assigned both to the class/category "portrait" (on the basis of the content), and to the class/category "vacation" (on the basis of a date occurring during vacation). The linkages then may be stored as result in an index database 300 configured as memory component having indexes of the messages of different classes/categories, and/or they are stored in a memory area for supplementary information of individual messages 52. The memory area for supplementary information of individual messages 52 may include, for example, the CLI and/or the user identification and/or the ascertained age group and/or the gender and/or the determined emotions and/or the acquired and/or ascertained supplementary information, determined identifications, Galileo data, temperature data, data regarding air humidity, brightness and additional similar data.

In another development, the assignment of a message to a class may be provided with weighting coefficients or confidence values which rate the reliability of the assignment to a particular class.

New possibilities for adapting and optimizing utilized technologies (i.e., FIG. 1) result from the large number of data obtained via classification and knowledge management and their linkings in integrated messaging systems and/or from additional linkages whose data come from external sources which were accessed via Internet/Intranet (21).

Furthermore, with the aid of a module for classifying and/or comparing with available data of similar classes 400, the results of the language detection can be classified and compared to older detection results (text including possible N-best lists) of the same message class. This embodiment/method may be used to determine word sequences describing a similar set of facts, for instance. By an additional application of technologies of associative knowledge management, implemented via a module for associative knowledge management 410, new words/word combinations and/or phoneme sequences, for instance, may be found as well which, when occurring in connection with specific message classes, are able to be linked to these classes and will then be available to further optimize the detection results within this message class. These words/word combinations and/or phoneme sequences previously unknown to the system are thus able to be utilized as key for additional linkages.

As described earlier, an image message may be assigned both to the "portrait" class/category and the "vacation" class/category. As a result, the linkages are then stored in an index database 300 which is assigned to the mailbox system operator, and/or they are stored in the memory area for supplementary information of individual messages 52 of the mailbox owner. To support the additional application of associative knowledge management, in an effort to simplify the search for messages of specific categories, the sender information (user identifications such as sender ID, CLI, HLR, e-mail address, etc.) may be expanded by supplementary information (such as date stamp, length, etc.) and links that point to the indexes assigned to the individual message classes (with a correspondingly similar annotation behavior) to which the message was assigned as well. For instance, if a plurality of messages of the "vacation2004" class has already been assigned for a sender, other messages whose content does not suggest this class at first glance (a portrait, for instance), also may be assigned to the "vacation2004" class via analysis of the time information and/or CLI.

In addition, it is possible to replace specific indefinable words/word combinations and/or phoneme sequences by words/word combinations from similar utterances within the same message class and possibly by the same speaker. A similar method for optimizing translation results, utilizing old data from the translation results of a message class that contain, for instance, pairs of word combinations/word sequences in different languages, may be used.

The entire messaging system and/or information from communication network 20 or from Internet/Intranet 21 and connected databases are/is thus utilized as background knowledge (world knowledge) to improve the characteristics of individual components such as that of ASR module 70 with algorithms for language detection, translation system 190 and the module for analyzing sender emotions 220.

Furthermore, it is an obvious thing to utilize data for location determination, for example, via GPS, Galileo, and data regarding temperature, humidity and brightness for the classification of messages as well (see also FIG. 2). Some of these media types may also be generated within the system, as supplementary information. For example, the brightness is able to be determined on the basis of the color spectrum of attached instantaneous image information. Systems for acquiring various sensor data and their transmission via a telecommunication network are available. If these data are now transmitted together with messages left and received in a memory area for supplementary information of individual messages 52, this will result both in new classification possibilities within the messaging system and in more refined search criteria within individual message classes.

The operator may thus use the wealth of messages and their contents in the messaging system to play the role of contact provider for the acquisition of contents. For example, if a mailbox owner is searching for "evening images of Naples", this information may be used both to describe a new class and, given available linkings with the classes "images", "Naples", to search for image messages that have a corresponding color spectrum and were sent at specific times of the day. All messages that include corresponding GPS data, for example, may be included in the class "Naples" as well. The creator of these messages, his or her consent having been obtained, may then be disclosed to the searching mailbox owner.

The available classification rules may also be used to filter out unwanted messages (such as spam). Due to the structures introduced by the present invention, this applies not only to pure text messages, but to the message types described in FIG. 2 as well.

As with parameters and parameter linkages included in the owner data area for acquired and/or ascertained owner data 170, the memory for static and dynamic parameter linkages for analyzing sender and owner information 290, and the data memory with sample data 260, it is possible to calculate, as classification result, a priority or a score of a message and/or its segments which is able to be utilized for sequencing or for acoustical and/or visual marking of the message documents and/or their segments.

An acoustical marking may be implemented by, for example, a) changing the voice, the volume and/or the prosody during reproduction of texts via text-to-speech systems;

b) omitting from the reproduction of text segments via text-to-speech systems and/or from speech segments non-marked segments or segments below or above a limit priority specified in the memory for static and dynamic parameter linkages for analyzing sender and owner information 290 or in the data memory with sample data 260;

c) signal tones; or d) a combination of the mentioned methods.

The illustrated exemplary structure for analyzing the message contents is used to automatically generate responses to a message, possibly according to parameter linkages specified in a mailbox-specific manner. If the mailbox owner is a public institution, for example, even previously prepared document models may be sent to the particular sender for completion upon evaluation of corresponding contents, or be forwarded to a language portal after the caller has left a voice mail, the portal offering the caller a variety of options (among them the mailing of standard forms). If such a response has been generated by the system, the message left is amended by a report to this effect, so that the mailbox owner is notified of the automatic mailing of the answer. This may be done via a voice recording and/or a text message and/or via other media (SMS, MMS, animation, image, smiley, etc.).

The system has an additional connection to a data network such as Internet/Intranet 21. This also allows a semantic analysis to be implemented in order to evaluate external documents that provide additional information regarding the available data in the system, for instance the address data.

The parameter linkages stored in the data memory with sample data 260 for analyzing sender information may be supplemented by additional linkages that are used to generate automatic responses to already classified contents. This can be done both with a time offset by sending an answer message to the sender, and in real time by a spoken dialogue, immediately upon leaving a voice mail. In this case, the asynchronous communication between at least two partners supported by a messaging system is converted into a synchronous communication. Standard responses or parts of such for specific received message classes and/or their segments may be stored in various formats for this purpose, for example, in the memory for static and dynamic parameter linkages for analyzing sender and owner information 290. Responses automatically generated by the system are linked or attached to the corresponding received message document for the mailbox owner's information. Once the content of the memory for static and dynamic parameter linkages for analyzing sender and owner information 290 has been analyzed automatically, it is also possible to respond with an automatically generated order for goods designations listed in the message document or its segments, for example, via Internet/Intranet 21.

Additional automatically generated responses of the system following analysis of the content of received message documents and/or their segments may include:

a) generating and sending at least one message document in response;

b) generating and sending at least one data file;

c) establishing at least one telephone/voice connection to at least one call line identification (such as call number, CLI, HLR, SIP address, etc.) stored in the sender data area for acquired and/or ascertained sender data 60 or in the owner data area for acquired and/or ascertained owner data 170, or in the memory for static and dynamic parameter linkages for analyzing sender and owner information 290;

d) generating and/or sending a signal;

e) Combinations of the responses listed under a), b), c) or d).

For example, the system may already generate proposals for responses and offer them to the mailbox owner.

What is claimed is:

1. A method for processing messages within the framework of an integrated messaging system, comprising:
    ascertaining an identification,
    gathering text data and voice data from an instantaneous message,
    processing the text data and voice data from the instantaneous message by a translation system and,
    analyzing the processed text data and voice data together with at least one of:
    at least one of sound data, image data, messages with other types of media in connection with the instantaneous message, and data derived from additional information sources;
        data stored within the framework of previous messages in a sender data area for at least one of acquired and ascertained sender data; and
        data of additional features from the owner data area for at least one of acquired and ascertained owner data,
        such analysis being implemented according to at least one of semantic, prosodic, phonetic and other analytical methods, and image processing methods, for the presence of information/data that are suitable to convey to the recipient both the message itself and the background information in connection with the message in the most authentic form possible, both the instantaneous message and the data derived from the message being evaluated according to predefined classification rules and assigned to different classes of a linking matrix configured as assignment matrix (n:m), and the data provided within the framework of the linking matrix being stored in at least one of an index database and in a memory area for information of individual messages.

2. The method as recited in claim 1, wherein, to translate the instantaneous message, the language of the message and/or a segment of the message is determined according to the relation $$L = \mathrm{argmax}(W_{CL}(Lx) + W_{LD} * C_{LD}(L_x) + W_T * C_T(L_x) + W_H * N_H(L_x) + \ldots + W_n * C_n(L_x)),$$

the relation being implemented sequentially for each source language supported in the system, and the language ($L_x$) for which L exhibits the maximum value being considered the source language (L) as a result, and in the case of identically high maximum values or maximum values for at least two languages that are very similar, information for correcting the weighting factors being output automatically.

3. The method as recited in claim 1, wherein the data record containing the result of the language detection of the source language is analyzed both for the further adjustment with respect to the automatic selection of the source language for the translation system and for the automatic selection of the target language into which the voice and/or text massage is to be translated.

4. The method as recited in claim 1, wherein the control of the individual translation modules of the translation module with decision matrix is implemented via the decision matrix into which both the result of the detection of the source language and the ascertained target language are input automatically.

5. The method as recited in claim 1, wherein, in addition to the data resulting from the translation of the message, additional information is provided to the recipient of the message which is ascertained by utilizing principles of associate knowledge management.

6. The method as recited in claim 1, wherein, in addition to the data relating to the profile of the sender, the identification such as name, first name, sender identification e-mail address, country code, gender, different call numbers and role assignment for defined call numbers, the data record of the mailbox owner also stores data regarding source languages that are excluded from a translation.

7. The method as recited in claim 1, wherein, to ascertain the emotional state of the sender of a message, both the results of the prosodic analyses of voice messages and the results of the semantic analysis of attached text files, as well as available image and/or video information are being analyzed.

8. The method as recited in claim 1, wherein the gender and/or the age of the sender of the message is ascertained with the aid of data from at least one module for speaker classification and/or with the aid of data from a module for ascertaining the most probable gender while including data from earlier messages from the sender data area for acquired and/or ascertained sender data including supplementary information.

9. The method as recited in claim 1, wherein instantaneous data for the most probable emotional state of the sender of the message together with the data regarding age and gender of the sender of the message are used for further statistical analysis; these data together with additional data ascertained by analyzing the sender information are combined into data records within the framework of parameters and/or parameter linkages, a division being implemented into static and/or dynamic parameters and/or parameter linkages.

10. The method as recited in claim 1, wherein the data regarding the most probable emotional state of the sender of the message is used to classify the messages in a priority list pertaining to the incoming messages.

11. The method as recited in claim 1, wherein the incoming messages are assigned to different message types, the data resulting from the different message types being processed according to predefined classification rules and assigned to different classes/categories via a linking matrix, and the data, having been assigned to the particular classes and/or categories, are assigned to an index database of the mailbox system operator and/or stored in corresponding classes in the memory area for supplementary information of individual messages of the mailbox of the individual mailbox owner.

12. The method as recited in claim 1, wherein the data stored in the index database of the mailbox system operator and/or the data stored in the memory area for supplementary information of individual information and sorted according to classes/categories are provided with coefficients within the classes/categories, which determine the reliability of the assignment to a specific class.

13. A system for processing messages within the framework of an integrated messaging system, comprising
    at least one translation system with automatic foreign language detection;
    at least one module for prosodic analysis of speaker emotions;
    at least one module for semantic analysis of sender emotions;
    at least one data memory with information regarding the languages that are able to be processed by the available emotion-analysis module and/or the translation module(s);
    at least one data memory with sample data and/or dynamic/static parameters and/or parameter linkages for analyzing collected sender information;

at least one sender data area for acquired and/or ascertained sender data to which the data ascertained via the aforementioned module are supplied; and at least one classification block, wherein the at least one classification block to which all data including supplementary data of a message are supplied according to the data type, is made up of

- a message classification module in which the messages are sorted according to their message type;
- a linking matrix, which is connected to the message classification module and which is configured as assignment matrix (n:m) for different classes/categories; and
- an index database connected to the linking matrix, the message classification module having a cross connection to the memory for static and dynamic parameter linkages for analyzing sender and owner information, to the data memory with sample data and to the output module for target languages, and the linking matrix and the index database having a cross connection to the mailbox.

14. The system as recited in claim 13, wherein the translation system is made up of

- a module for language identification/language detection with the aid of a text, having access to an ASR module with algorithms for language detection;
- a language evaluation module connected to the module for language identification/language detection on the basis of a text, having access to a memory area for supplementary information of individual messages, to a module for language detection, and to a module for ascertaining the most probable gender;
- a decision module connected to the module for language identification/language detection on the basis of a text, having outputs to the input module for source languages, to an interface module for selecting the source language and to a module for supplementing the messages by supplementary information, the decision module having access to the ASR module and being made up of
- a translation module with decision matrix, which is linked to the input module for source languages having the source languages (S1-Sn), the output module for target languages having the target languages (S1-Sm), the interface module for selecting the source language, and a module for selecting the target language, the module for selecting the target language having a cross connection to the owner data area for acquired and/or ascertained owner data, and the output module for target languages having cross connections to the module for supplementing the messages by supplementary information, to a module for analyzing sender emotions and to a classification block.

15. The system as recited in claim 13, wherein the at least one classification block to which all data including supplementary data of a message are supplied according to the data type, is made up of

- a message classification module in which the messages are sorted according to their message type;
- a linking matrix, which is connected to the message classification module and which is configured as assignment matrix (n:m) for different classes/categories; and
- an index database connected to the linking matrix, the message classification module having a cross connection to the memory for static and dynamic parameter linkages for analyzing sender and owner information, to the data memory with sample data and to the output module for target languages, and the linking matrix and the index database having a cross connection to the mailbox.

* * * * *